(12) United States Patent
Park et al.

(10) Patent No.: US 10,419,188 B2
(45) Date of Patent: Sep. 17, 2019

(54) VIRTUAL TIME-DOMAIN MULTIPLEXING FOR REFERENCE SIGNALS AND DATA WITH MODIFIED CYCLIC PREFIX

(71) Applicant: QUALCOMM Incorporated, San Diego, CA (US)

(72) Inventors: Seyong Park, San Diego, CA (US); Jing Sun, San Diego, CA (US); Xiao Feng Wang, San Diego, CA (US); Hao Xu, Beijing (CN); Tao Luo, San Diego, CA (US); Yi Huang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/920,339

(22) Filed: Mar. 13, 2018

(65) Prior Publication Data
US 2018/0278397 A1    Sep. 27, 2018

Related U.S. Application Data

(60) Provisional application No. 62/476,597, filed on Mar. 24, 2017.

(51) Int. Cl.
*H04L 5/00* (2006.01)
*H04J 3/00* (2006.01)
*H04L 27/26* (2006.01)

(52) U.S. Cl.
CPC .............. *H04L 5/0053* (2013.01); *H04J 3/00* (2013.01); *H04L 5/0044* (2013.01);
(Continued)

(58) Field of Classification Search
CPC .................................................. H04L 27/0601
See application file for complete search history.

(56) References Cited

U.S. PATENT DOCUMENTS

| | | | |
|---|---|---|---|
| 2003/0048462 A1* | 3/2003 | Williams | .............. H04L 27/261 358/1.9 |
| 2004/0254969 A1* | 12/2004 | Pisoni | ................. H04L 27/2662 708/404 |

(Continued)

FOREIGN PATENT DOCUMENTS

WO    2009021244 A2    2/2009

OTHER PUBLICATIONS

"Fundamentals of Wireless Communication" by David Tse and Pramod Viswanth, Cambridge University Press, published 2005, retrieved from http://www.ifp.illinois.edu/~pramodv/wireless_book.html). (Year: 2005).*

(Continued)

*Primary Examiner* — James P Duffy
(74) *Attorney, Agent, or Firm* — Loza & Loza, LLP

(57) ABSTRACT

Aspects of the disclosure relate to methods and apparatus of time-domain multiplexing (TDM) for reference signals (RS) and data using a modified cyclic prefix. A reference signal (RS) and data are multiplexed either in a single symbol or in two time consecutive symbols that respectively including the RS and data. The cyclic prefix (CP) is added to the single symbol using a portion of the RS or to a first symbol of the two time consecutive symbols using a portion of the RS. The CP may be copied from the RS or the end of the symbol, but not the data, in a manner that affords a virtual Time Division Multiplexing (TDM) of the RS and data before discrete Fourier transform (DFT) spreading is performed in a transceiver to provide lower peak to average power ratios and no Inter-symbol interference.

30 Claims, 17 Drawing Sheets

(52) U.S. Cl.
CPC ...... *H04L 27/2607* (2013.01); *H04L 27/2608* (2013.01); *H04L 27/2611* (2013.01); *H04L 27/2636* (2013.01)

(56) References Cited

U.S. PATENT DOCUMENTS

| | | | | |
|---|---|---|---|---|
| 2011/0149765 | A1* | 6/2011 | Gorokhov | H04L 1/0026 370/252 |
| 2011/0268101 | A1* | 11/2011 | Wang | H04L 5/0053 370/344 |
| 2016/0338081 | A1* | 11/2016 | Jiang | H04W 72/1205 |

OTHER PUBLICATIONS

Bertrand P., "Frequency Offset Estimation in 3G LTE", 2010 IEEE Vehicular Technology Conference (VTC 2010—Spring)—May 16-19, 2010—Taipei, Taiwan, IEEE, US, May 16, 2010 (May 16, 2010), pp. 1-5, XP031696032, ISBN: 978-1-4244-2518-1.

IIth, et al., "Pre-DFT Multiplexing of RS and Data: Results on Short Duration One OFDM Symbol Uplink", 3GPP Draft; R1-1701913, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13, 2017-Feb. 17, 2017, Feb. 12, 2017 (Feb. 12, 2017), 7 Pages, XP051209075, Retrieved from the Internet: URL: http://www.3gpp.org/ftp/Meetings_3GPP_SYNC/RAN1/Docs/ (retrieved on Feb. 12, 2017).

IIth, et al., "Pre-DFT Multiplexing of RS and UCI/Data for Short Duration PUCCH", 3GPP Draft; R1-1704783, 3rd Generation Partnership Project (3GPP), Mobile Competence Centre ; 650, Route Des Lucioles; F-06921 Sophia-Antipolis Cedex; France, vol. RAN WG1, no. Spokane, USA; Apr. 3, 2017-Apr. 7, 2017 , Mar. 22, 2017 (Mar. 22, 2017), 8 Pages, XP051250496, Retrieved from the Internet: URL: http://www.3gpp.org/ftp/tsg_ran/WG1_RL1/TSG_R1_88b/Docs/ [retrieved on Mar. 22, 2017].

International Search Report and Written Opinion—PCT/US2018/022412—ISA/EPO—dated May 29, 2018.

Mitsubishi Electric: "On Phase and Frequency Tracking for DFTsOFDM", 3GPP Draft; R1-1703215 RAN188 PTRS_V2, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13, 2017—2017021712, Feb. 2017 (Feb. 12, 2017), 3 Pages, XP051210348, Retrieved from the Internet: URL: http://www.3gpp.org/ftp/Meetings_3GPP_ SYNC/RAN1/Docs/ [retrieved on Feb. 12, 2017].

* cited by examiner

VIRTUAL TIME-DOMAIN MULTIPLEXING FOR REFERENCE SIGNALS AND DATA WITH MODIFIED CYCLIC PREFIX

PRIORITY CLAIM

This application claims priority to and the benefit of provisional U.S. Provisional Patent Application No. 62/476,597 filed in the U.S. Patent and Trademark Office on Mar. 24, 2017, the entire content of which is incorporated herein by reference as if fully set forth below in its entirety and for all applicable purposes.

TECHNICAL FIELD

The technology discussed herein relates generally to wireless communication systems, and more particularly, to time domain multiplexing for reference signals and data using a modified cyclic prefix.

INTRODUCTION

In communication systems employing multiple access schemes such as orthogonal frequency division multiple access (OFDMA) or single carrier frequency division multiple access (SC-FDMA), it is desirable for reference signaling (RS) and data to be transmitted in a single orthogonal frequency division multiplexed (OFDM) symbol or SC-FDMA symbol or at least multiplexed over an OFDM symbol duration. A potential method for multiplexing the RS and data in a single symbol is to use frequency division multiplexing (FDM) for the RS and the data. This methodology may be problematic, however, as it is difficult to ensure a low Peak-to-Average Power Ratio (PAPR) due to the discrete Fourier transform (DFT) spreading utilized in the transmission of OFDM or SC-FDMA symbols. High PAPR values may be particularly problematic for uplink (UL) transmissions in mobile devices or user equipment (UE) where a concern is to keep the transmission power low in order to conserve energy in such devices. Accordingly, there is a need for multiplexing reference signals and data while also ensuring low PAPR values.

DEFINITIONS

RAT: radio access technology. The type of technology or communication standard utilized for radio access and communication over a wireless air interface. Just a few examples of RATs include GSM, UTRA, E-UTRA (LTE), Bluetooth, and Wi-Fi.

Multimode device: a device that can provide simultaneous connectivity across different networks, such as 5G, 4G, and Wi-Fi networks.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

RS: reference signal. A predefined signal known a priori to both transmitters and receivers and transmitted through the wireless channel, and used for, among other things, for channel estimation of the wireless channel.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, a method of wireless communication is disclosed that includes multiplexing a reference signal (RS) and data in one of a single symbol or two time consecutive symbols respectively including the RS and data. Additionally, the method includes adding a cyclic prefix (CP) to the single symbol using a portion of the RS or to a first symbol of the two time consecutive symbols using a portion of the RS.

In another aspect, an apparatus for wireless communication includes means for multiplexing a reference signal (RS) and data in one of a single symbol or two time consecutive symbols respectively including the RS and data. Further, the apparatus includes means for adding a cyclic prefix (CP) to the single symbol using a portion of the RS or to a first symbol of the two time consecutive symbols using a portion of the RS.

According to still another aspect, the a non-transitory computer-readable medium storing computer-executable code is disclosed comprising code for causing a computer to multiplex a reference signal (RS) and data in one of a single symbol or two time consecutive symbols respectively including the RS and data. The medium further comprises code for causing a computer to add a cyclic prefix (CP) to the single symbol using a portion of the RS or to a first symbol of the two time consecutive symbols using a portion of the RS.

In yet another aspect, an apparatus for wireless communication is disclosed including a processor, a transceiver communicatively coupled to the at least one processor, and a memory communicatively coupled to the at least one processor. The processor is configured to multiplex a reference signal (RS) and data in one of a single symbol or two time consecutive symbols respectively including the RS and data. Additionally, the processor is configured to further add a cyclic prefix (CP) to the single symbol using a portion of the RS or to a first symbol of the two time consecutive symbols using a portion of the RS.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As will discussed in more detail herein, the present disclosure sets forth methods and apparatus for multiplexing a reference signal (RS) with data within one OFDM symbol, which also provides for a low PAPR and no Inter-symbol interference (ISI). In particular, the methods and apparatus include the use of a cyclic prefix (CP) that is copied from the RS, but not the data (or the end of the symbol), in a manner that affords a virtual Time Division Multiplexing (TDM) of RS and Data before discrete Fourier transform (DFT) spreading in a transceiver.

Figure 1:
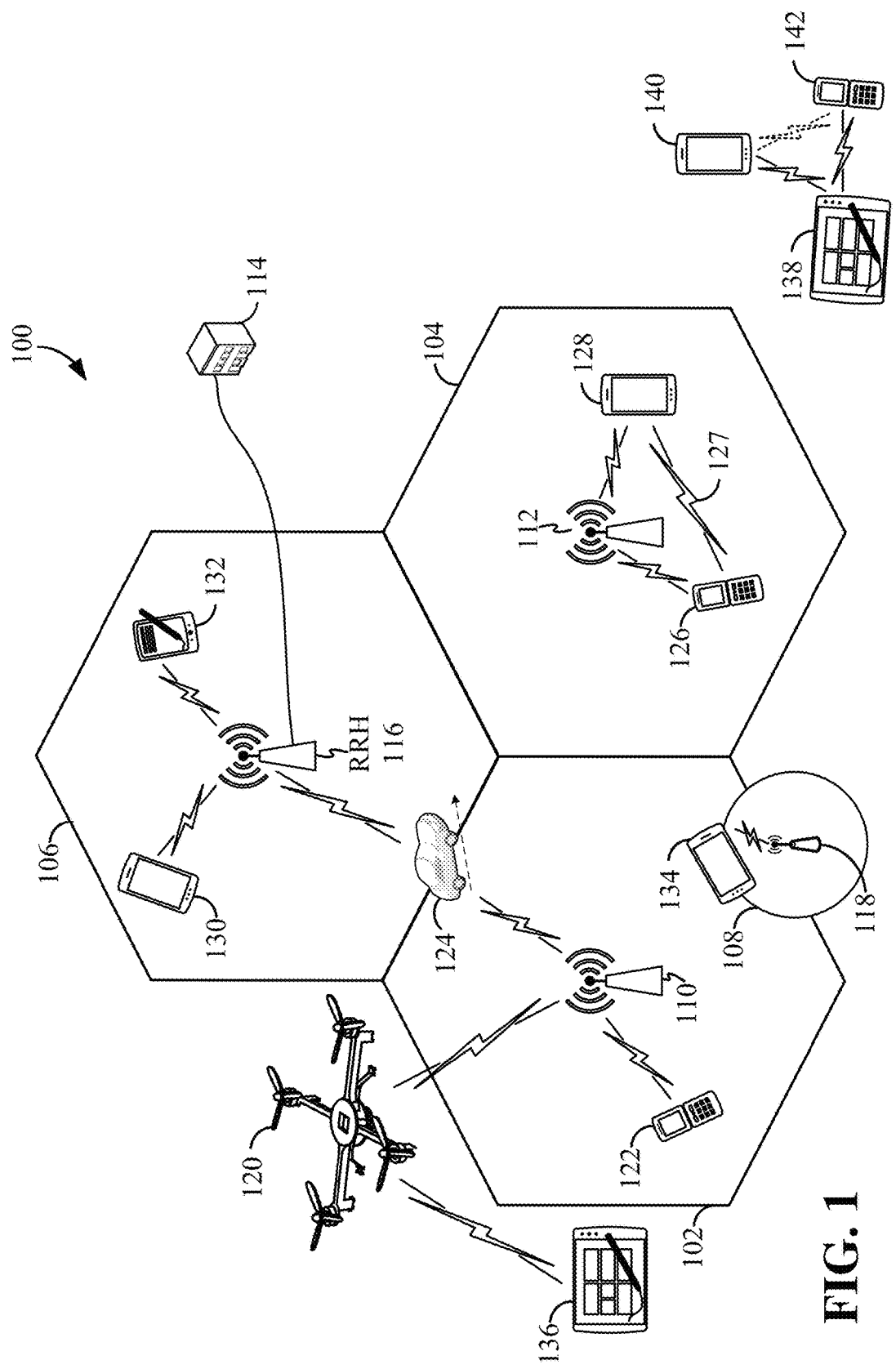
FIG. 1 is a conceptual diagram illustrating an example of a radio access network.

The various concepts presented throughout this disclosure may be implemented across a broad variety of telecommunication systems, network architectures, and communication standards. Referring to FIG. 1, as an illustrative example without limitation, a schematic illustration of a radio access network (RAN) 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), gNB, or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc.

A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node 120 (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target)

cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
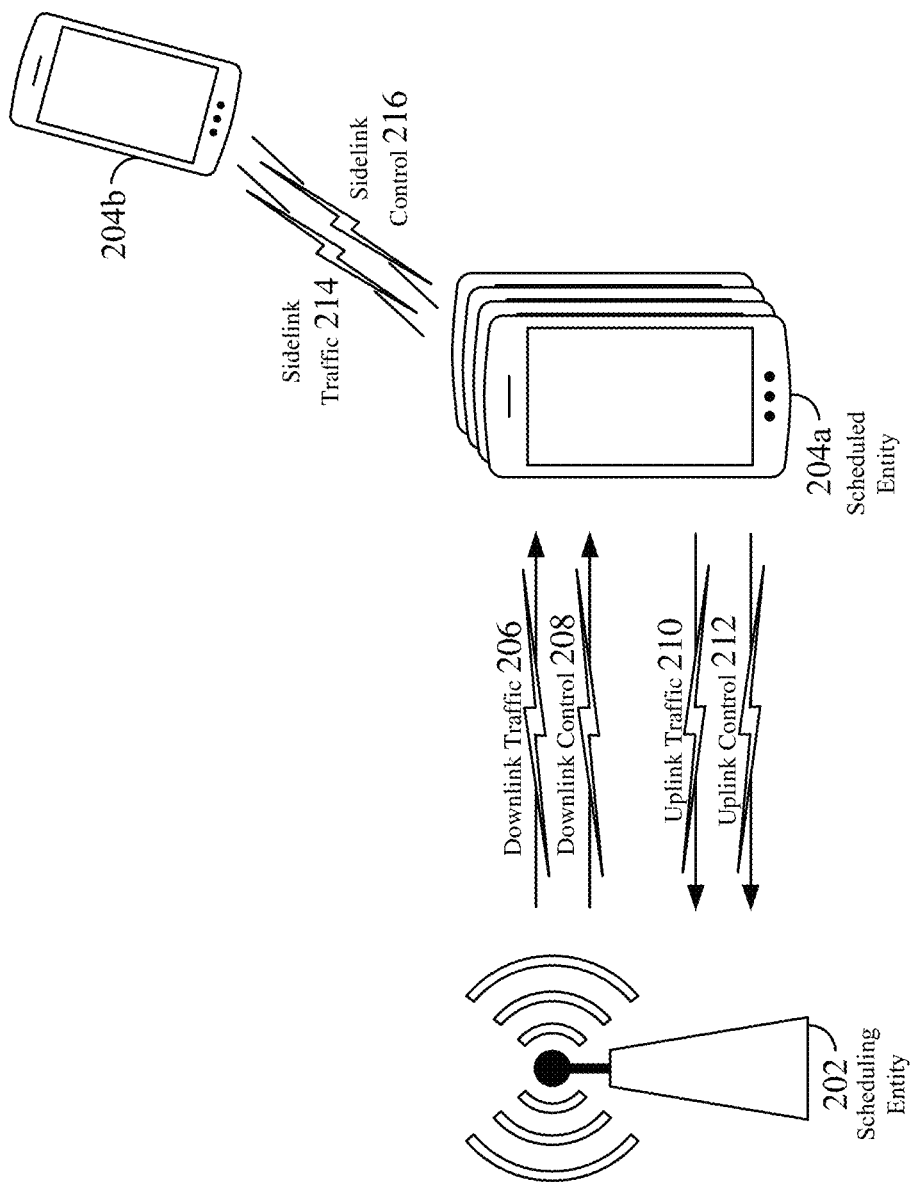
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives scheduling control information, including but not limited to scheduling information (e.g., a grant), synchronization or timing information, or other control information from another entity in the wireless communication network such as the scheduling entity 202.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 100 may additionally utilize one or more multiplexing and multiple access algorithms to enable simultaneous communication of the various devices. For example, 5G NR specifications provide multiple access for uplink (UL) or reverse link transmissions from UEs 122 and 124 to base station 110, and for multiplexing for downlink (DL) or forward link transmissions from base station 110 to one or more UEs 122 and 124, utilizing orthogonal frequency division multiplexing access (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 202 and scheduled entities 204 may include suitable hardware and capabilities (e.g., an encoder, a decoder, and/or a CODEC) to utilize one or more of these channel codes for wireless communication.

Within the present disclosure, a frame refers to a duration of 10 ms for wireless transmissions, with each frame consisting of 10 subframes of 1 ms each. On a given carrier, there may be one set of frames in the UL, and another set of frames in the DL.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
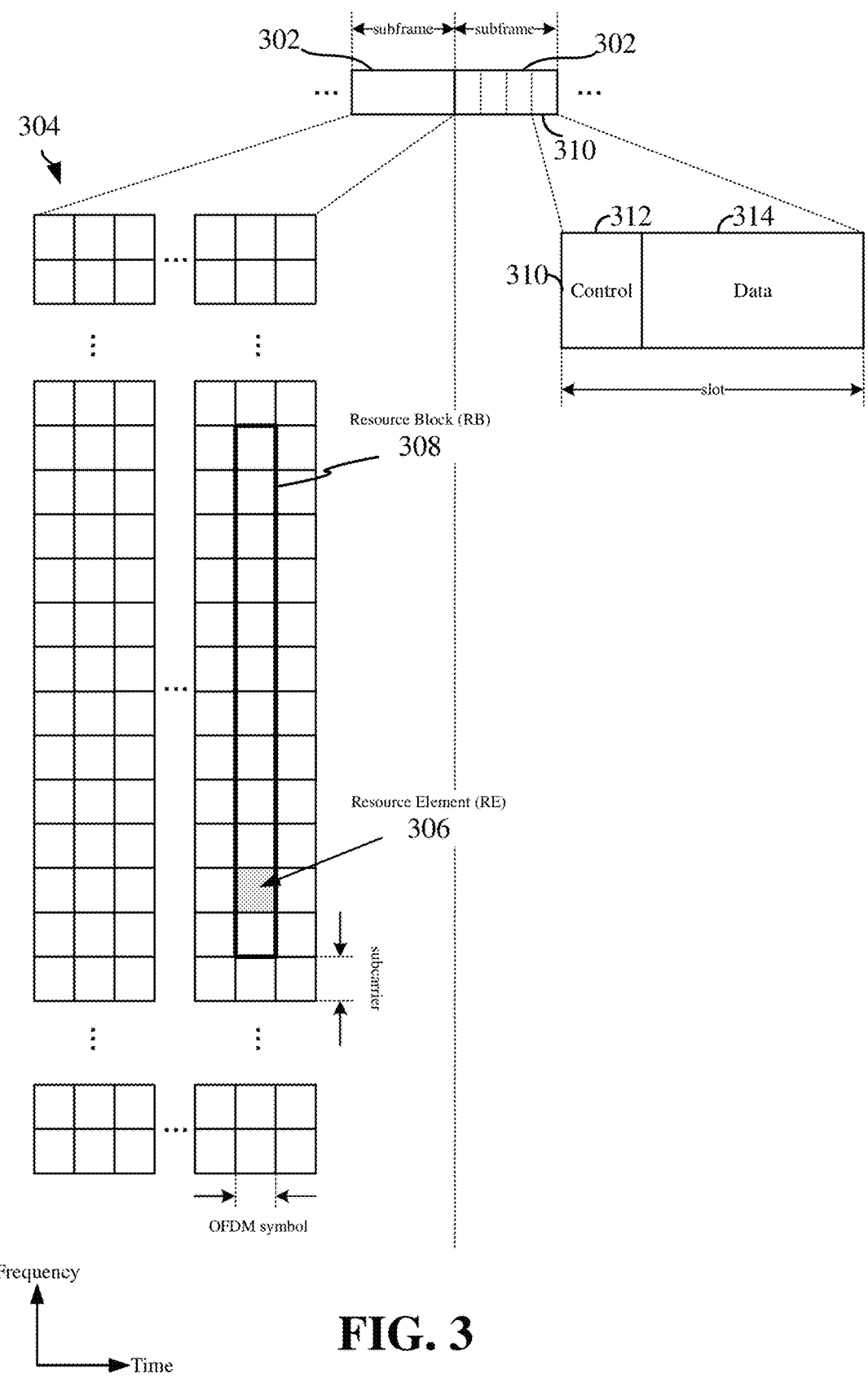
FIG. 3 is a schematic diagram illustrating organization of wireless resources in an air interface utilizing orthogonal frequency divisional multiplexing (OFDM).

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 202) may allocate one or more REs 306 (e.g., within a control region 312) to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 204) may utilize one or more REs 306 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 2 and 3 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
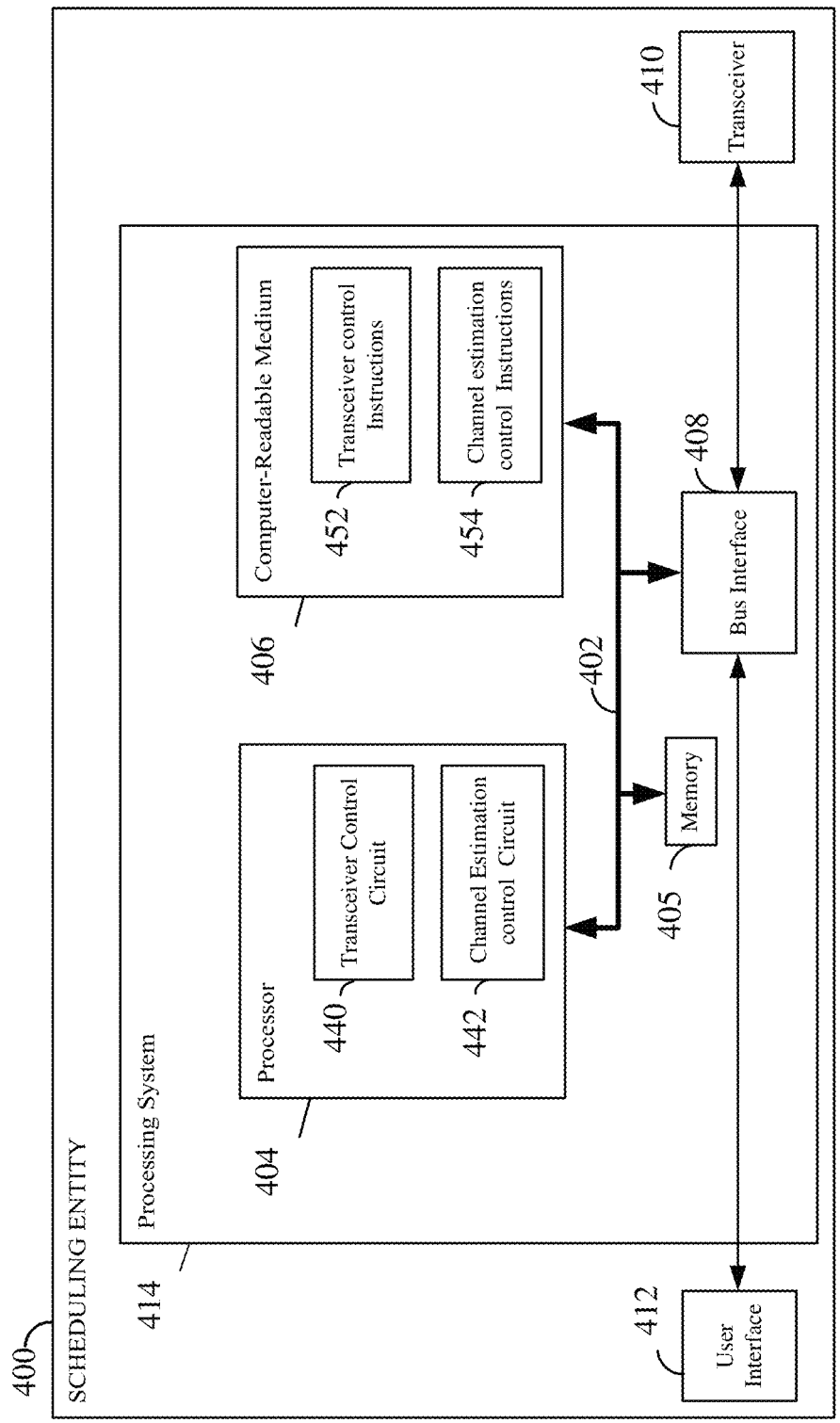
FIG. 4 is a block diagram illustrating an example of a hardware implementation for a scheduling entity apparatus employing a processing system.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1, 2, 8-10, 14, and 15 (Note: FIGS. 8-10, 14, and 15 show transmitter or receiver elements that may be employed in a scheduling or scheduled entity). In another example, the scheduling entity 400 may be a base station, a eNB, or a gNB as illustrated in any one or more of FIGS. 1, 2, 8-10, 14, and 15.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIG. 17.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided.

In some aspects of the disclosure, the processor 404 may include transceiver control circuitry 440 configured for various functions, including, for example, receiving a virtual TDM multiplexed symbol with a CP configured from an RS in a symbol rather than from data or the symbol as a whole. As an example, the transceiver control circuitry 440 may be configured to control a receiver portion of transceiver 410 or implement one or more of the functions described below in relation to FIGS. 13 and 14 or FIG. 18, including blocks 1802 and 1804, as examples.

In other aspects of the disclosure, the processor 404 may include channel estimation control circuitry 442 configured for various functions, including, for example, controlling the channel estimation used in a receiver portion of transceiver 410 a virtual TDM multiplexed symbol with a CP configured from an RS in a symbol rather than from data or the symbol as a whole. As an example, the transceiver control circuitry 440 may be configured to implement one or more of the functions described below in relation to FIGS. 14 and 15 or FIG. 18, including, e.g., blocks 1802 and 1804.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include transceiver control instructions or software 452 configured for various functions, including, for example, controlling receiver functions such as those that will be described in more detail below with respect to FIGS. 14 and 15. As another example, the medium 406 may include channel estimation control instructions or software 454 that may be configured to implement one or more of the functions described above in relation to FIG. 15, in particular, for channel estimation used when receiving virtual TDM symbols using a cyclic prefix (CP) based on the RS but not data in a symbol.

Figure 5:
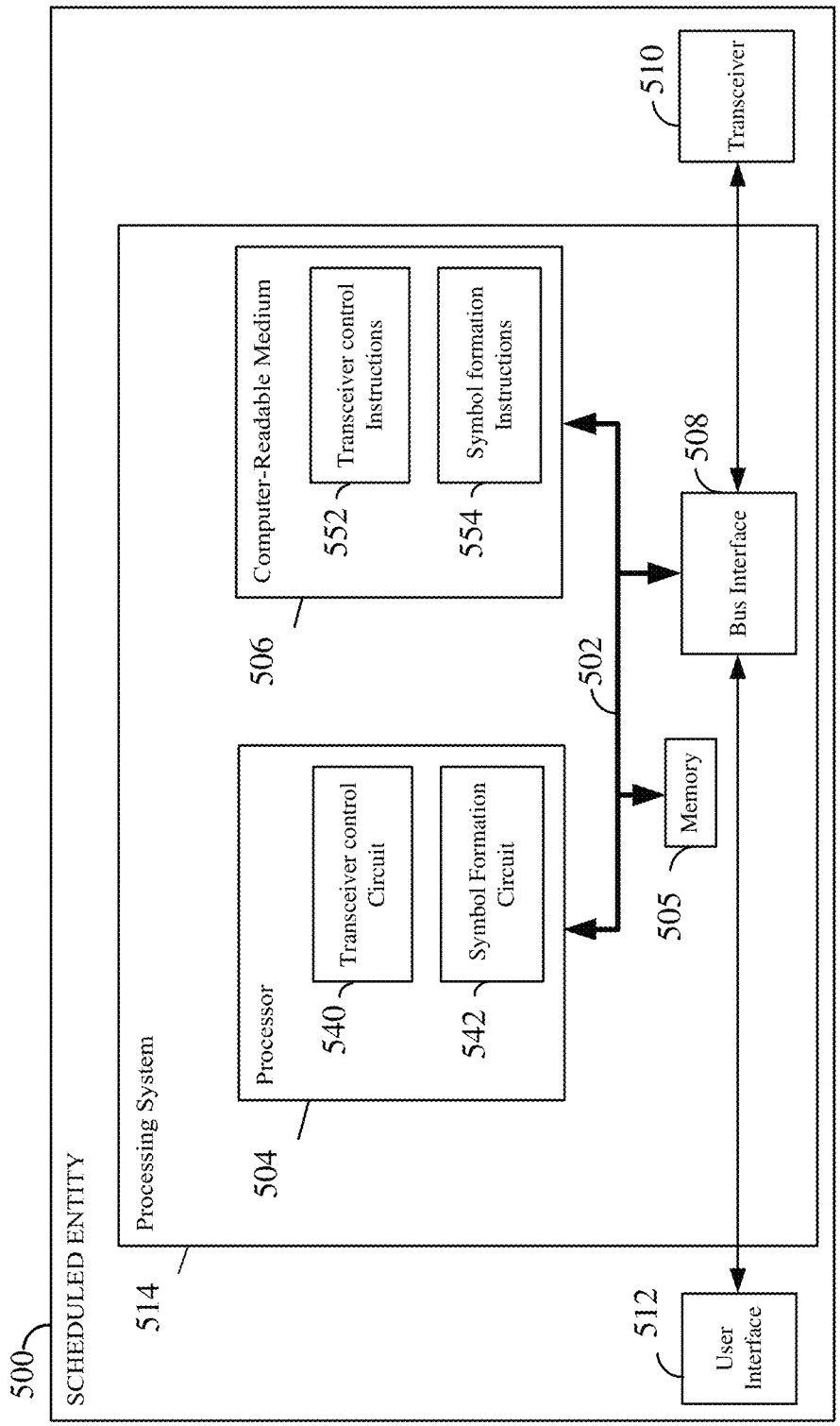
FIG. 5 is a block diagram illustrating an example of a hardware implementation for a scheduled entity apparatus employing a processing system.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, 8-10, 14, and 15.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIGS. 17 and 18.

In some aspects of the disclosure, the processor 504 may include transceiver circuitry 540 configured for various functions, including, for example, controlling the transmitter portion of transceiver 510 a virtual TDM multiplexed symbol with a CP configured from an RS in a symbol rather than from data or the symbol as a whole. As an example, the transceiver control circuitry 540 may be configured to implement one or more of the functions described below in relation to FIGS. 7-13 or FIGS. 17 and 18, including, e.g., blocks 1702 and 1704, or blocks 1802 and 1804.

In other aspects of the disclosure, the processor 504 may include symbol formation circuitry 542 configured for various functions, including, for example, controlling the symbol formation effectuated in a transmitter portion of transceiver 510 in order to implement a virtual TDM multiplexed symbol with a CP configured from an RS in a symbol rather than from data or the symbol as a whole. As an example, the symbol control circuitry 542 may be configured to implement one or more of the functions described below in relation to FIGS. 7-13 or FIGS. 17 and 18, including, e.g., blocks 1702 and 1704 or blocks 1802 and 1804.

In one or more examples, the computer-readable storage medium 506 may include transceiver control instructions or software 552 configured for various functions, including, for example, controlling the transmitter functions of the transceiver 510 such as those that will be described in more detail below with respect to FIGS. 7-13. As another example, the medium 506 may include channel estimation control instructions or software 554 that may be configured to implement one or more of the functions described above in relation to FIGS. 7-13, in particular, for symbol formation for forming and placing a cyclic prefix (CP) at the beginning of virtual TDM symbols where the CP is based on the RS but not data in a symbol.

Figure 6:
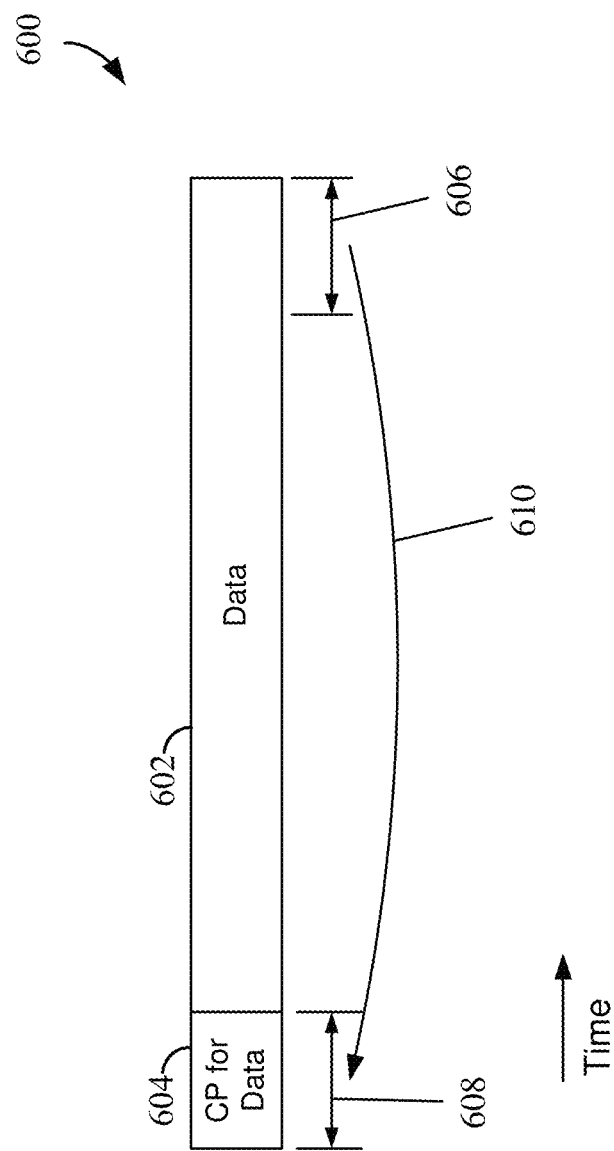
FIG. 6 illustrates an example of a conventional symbol structure for a DFT-spread-OFDM waveform over time.

FIG. 6 illustrates an example of a conventional symbol structure 600 for a DFT-spread-OFDM (or DFT-s OFDM) waveform over time that may be transmitted in a wireless communication system, such as by scheduled entity 500, as one example. As illustrated, the symbol structure 600 includes data 602 and a cyclic prefix (CP) 604 at the beginning of the symbol structure 600. The CP 604 is placed before the data 602 in order to help mitigate against inter-symbol interference (ISI) with another symbol (not shown) immediately preceding symbol 600 in time. In this conventional structure, the CP 604 is composed of or constructed with a copy of part of the data 602 that is taken from a tail or end portion 606 of the data 602 of symbol structure 600, and which is placed at a beginning portion 608 of the symbol structure 600 as indicated by arrow 610 to show that the data occurring at the end portion 606 of the symbol is copied and placed at the beginning portion 608.

Figure 7:
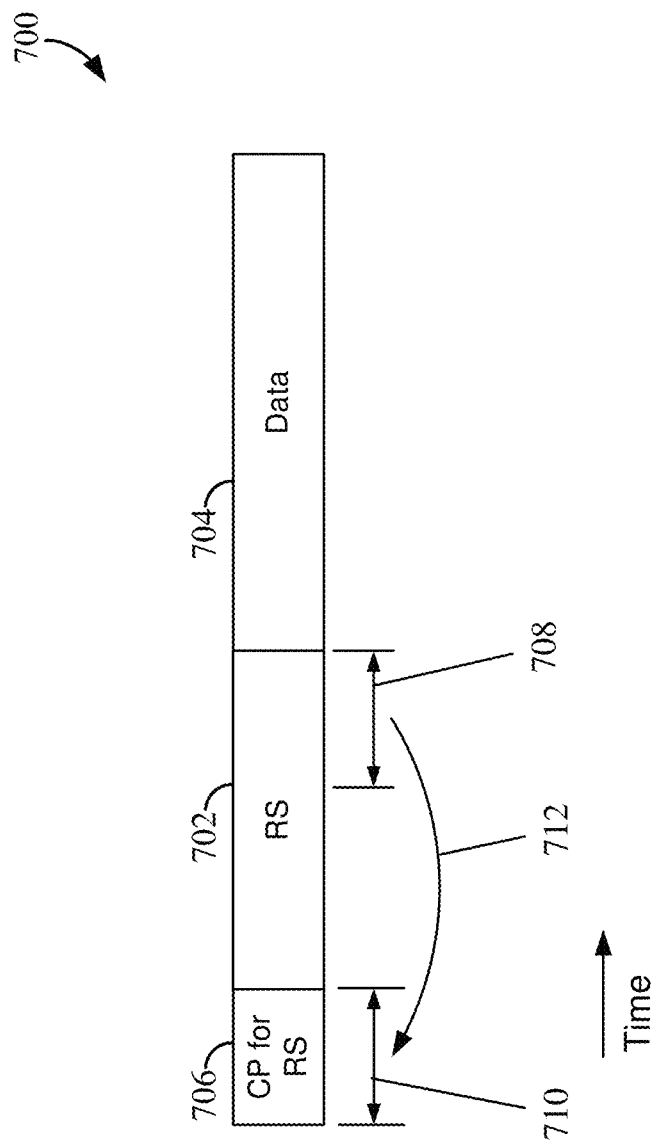
FIG. 7 illustrates an exemplary symbol structure for a DFT-spread-OFDM waveform configured according to the present disclosure.

In contrast to the conventional symbol structure of FIG. 6, FIG. 7 illustrates an exemplary symbol structure 700 configured according to an aspect of the present disclosure. The example of FIG. 7 features a symbol 700 that includes time division multiplexing of a reference signal (RS) 702 with data 704. The symbol structure 700 features a modified cyclic prefix (CP) that is different from the conventional CP formation and structure illustrated in FIG. 6. In particular, symbol structure 700 includes a cyclic prefix (CP) 706 that is configured specifically for the RS 702 to mitigate ISI that might affect the RS 702, rather than as a cyclic prefix that is configured for mitigating ISI of the data 704, as is done in the conventional structure illustrated in FIG. 6. Thus, the CP 706 may be considered as a cyclic prefix for the reference signal 702, rather than a conventional cyclic prefix that is for and immediately precedes data in a symbol as was illustrated in FIG. 6. The CP 706 is cyclically copied from an end portion 708 of the RS 702. This is different from the conventional structure 600 and CP 604, in particular, as the content of CP 706 is not copied from the data 704 in the symbol structure 700, but instead from the RS 702. The copied information from portion 708 of RS 708 is placed at a beginning portion 710 of the symbol structure 700 as shown by arrow 712 to serve as the CP 706 for the RS 702. As will be further explained later with respect to FIG. 8, this symbol structure 700 is engendered by a type of virtual time division multiplexing (TDM) of the RS 702 and the data 704 for a single OFDM symbol, and that is also effectuated prior to DFT spreading in a transmitter. This multiplexing of the RS and data within a single OFDM symbol along with an inversion of the CP 706 being copied from the RS 702 rather than from the data 704 provides multiplexing of RS and data within one OFDM symbol, as well as the benefits of a lowered PAPR, and no ISI of the data 704 as the CP 706 configured for the RS 702 more effectively guards from such interference.

Figure 8:
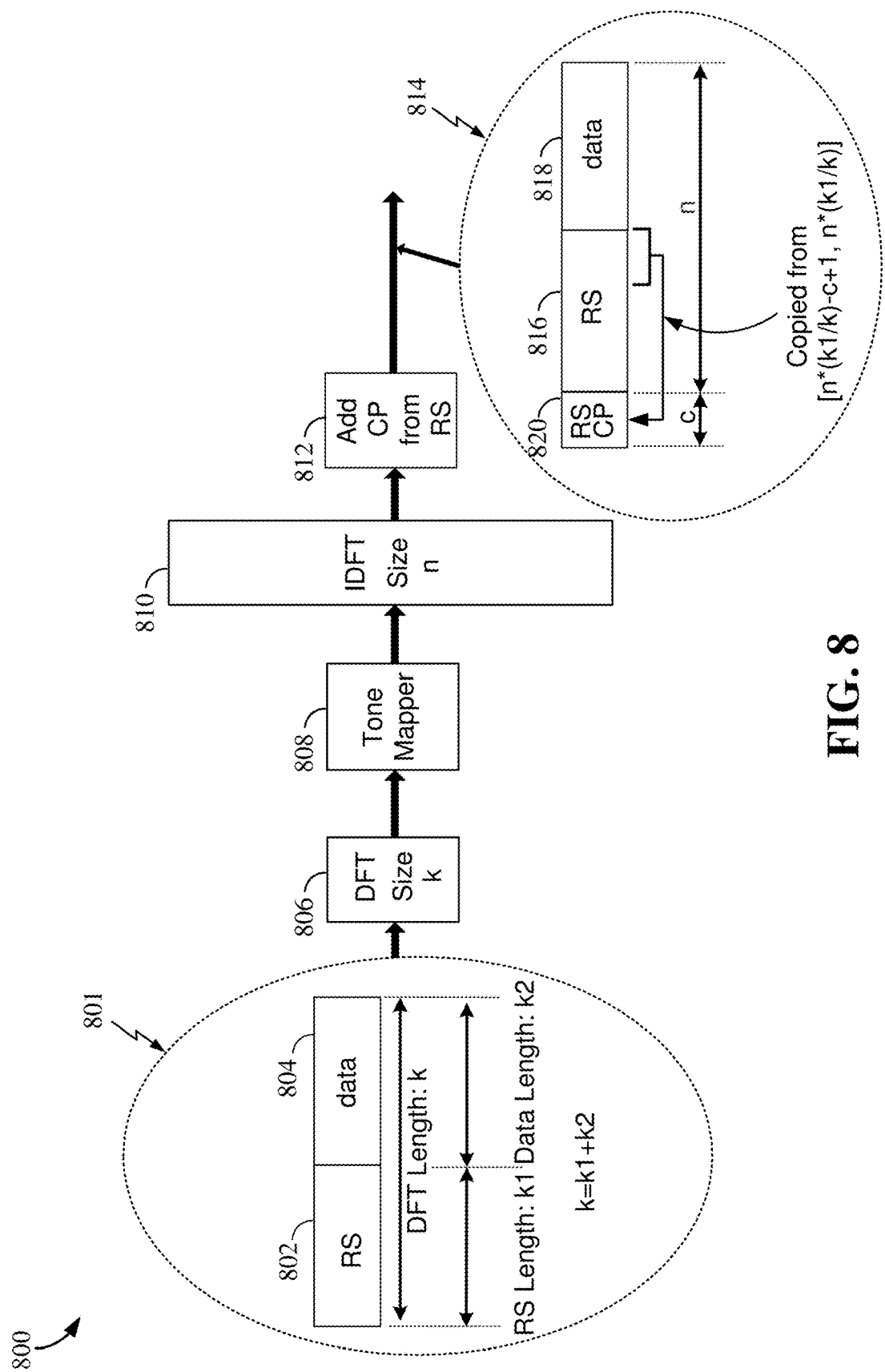
FIG. 8 illustrates an exemplary transmitter utilizing RS and Data virtual time division multiplexing (TDM) before a DFT-spread.

FIG. 8 illustrates an exemplary transmitter diagram 800 utilizing RS and data virtually time division multiplexed before DFT-spreading. The transmitter 800 receives a virtual TDM symbol 801 having a length k equal to a DFT spread length k and composed of the RS 802 with a length k1 and data 804 with a length k2 where k=k1+k2. Although it is to be understood that the respective lengths k1 and k2 may be one of a number of various different lengths, in one example at least k1 may be configured to be an integer fraction of the total DFT spread length k (e.g., k1=k/2, k1=k/3, k1=k/4, etc.). It is noted here that the term "virtual TDM" for purposes of this application denotes that TDM is applied before DFT-spreading. TDM, on the other hand, implies that time division multiplexing is applied after DFT-spreading and the IFFT in the OFDM waveform synthesis.

The virtual TDM symbol 801 is input to a DFT block 806 for DFT spreading.

The spread symbol samples, which are in the frequency domain at the output of DFT block 806, are input to a tone mapper block 808 for subcarrier mapping to various respective subcarriers to achieve the assignment of each subcarrier as a resultant linear combination of all modulated data symbols that are transmittable at the same time instant in an SC-FDMA slot or frame, as one example.

After the tone mapping is performed in tone mapper block 808, the k number of output samples are inverse discrete Fourier transformed (i.e., an IDFT, which may be embodied with an inverse fast Fourier transform (IFFT) in one example) back to the time domain at IDFT block 810 to yield a symbol having a length of "n" samples. A CP is then cyclically copied from the tail portion of the RS portion of the symbol, not the data portion of the symbol, by CP insertion or adding block 812 and the copy is placed at the beginning of the symbol. An example is shown by symbol 814 output by the CP insertion or adding block 812, having an RS portion 816, a data portion 818, and a CP 820 that has been copied from the tail of RS portion 816. In one example, the length of the CP 820 has a length "c" (e.g., a predetermined length) and the number of samples copied from RS portion 816 is in the range from n*(k1/k)−c+1 to n*(k1/k). It is noted that the labeling "RS CP" for CP 820 shown in FIG. 8 denotes that the CP is copied from the RS portion and is configured for, among other things, mitigating ISI for the RS information 816.

Figure 9:
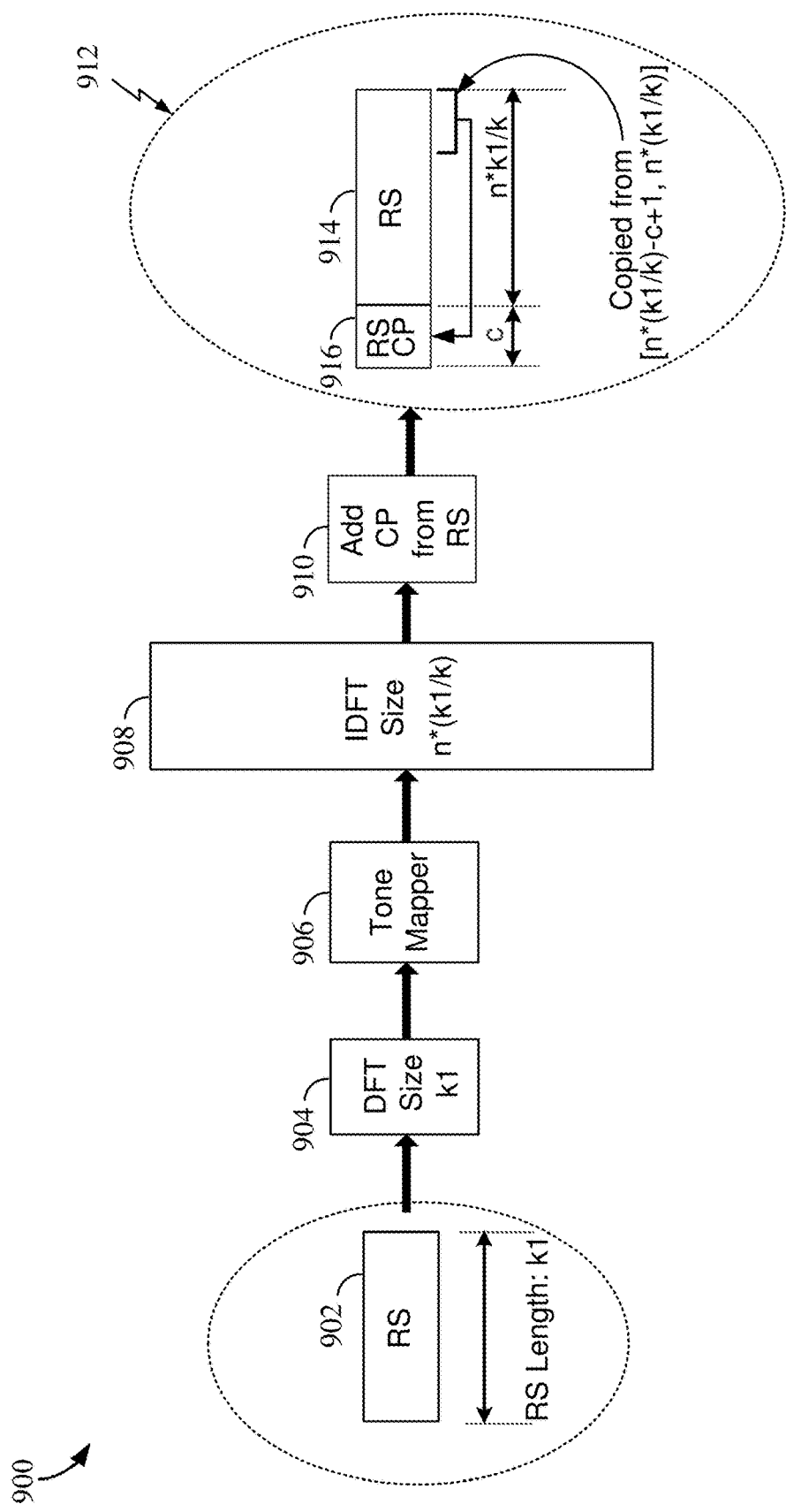
FIGS. 9 and 10 illustrate another exemplary transmitter utilizing a split TDM symbol that separately processes the RS and the data of a symbol.
Figure 10:
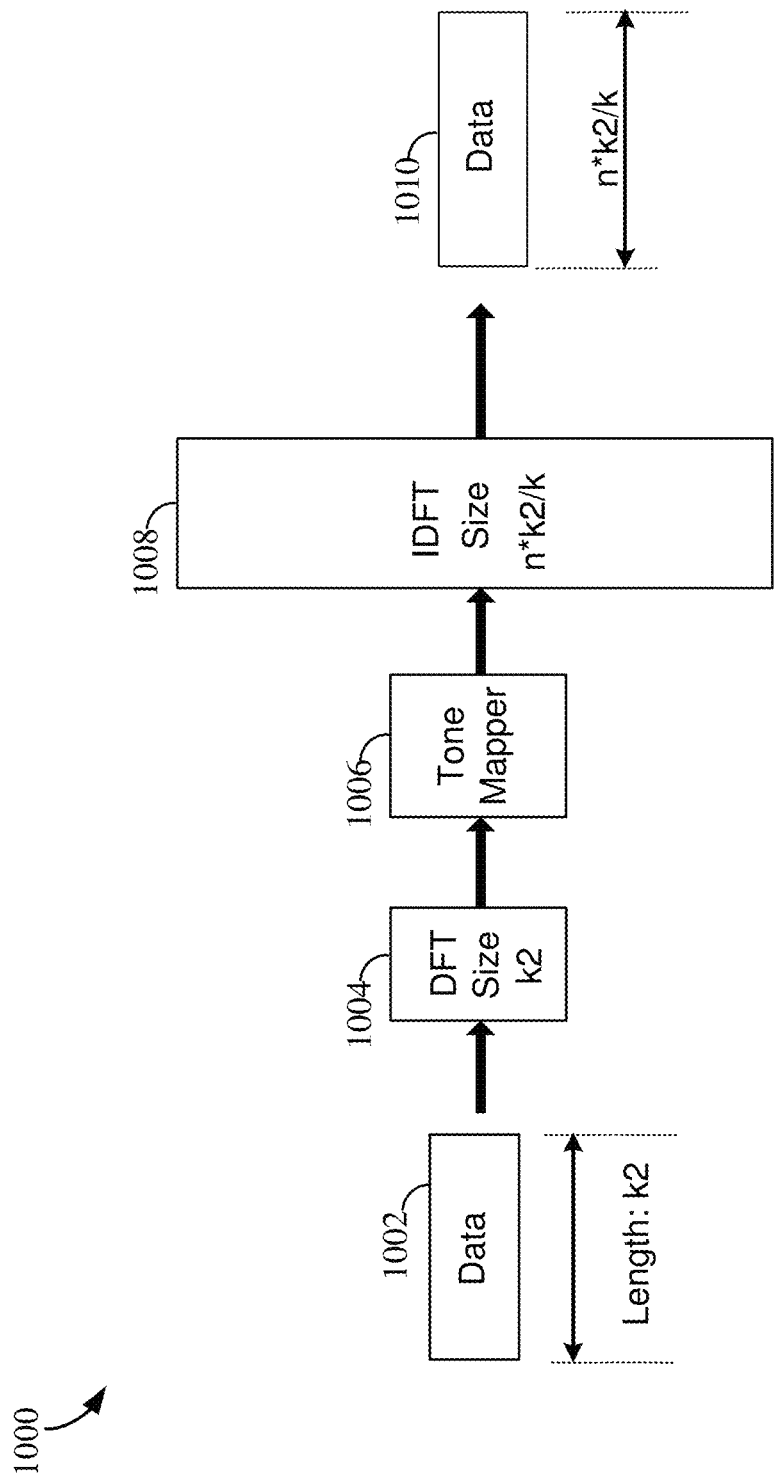

According to another example, the transmitter may be configured to split or bifurcate the TDM symbol by separately processing the RS and the data of a symbol. In this example, the RS is first presented to the transmitter as a first symbol and then the data is presented to the transmitter in an immediately succeeding second symbol, as illustrated in the examples of FIGS. 9 and 10. In these illustrations, although the RS and data are time division multiplexed, the TDM is accomplished by bifurcating the symbol for processing at first and second times, which will be illustrated by FIG. 9 and FIG. 10, respectively.

Turning to FIG. 9, the illustrated transmitter 900 first receives the RS 902 of a symbol having a length of k1.

Although the length k1 may be configured to be any of a number of lengths, in an aspect the RS Length (k1) may be configured to be an integer fraction of the total length k where k=k1+k2, with k2 being the length of the data. It is noted here that FIG. 9 may represent or show one (e.g., a first) time in which the RS of a symbol is received, whereas FIG. 10, to be discussed below, may represent a second (e.g., subsequent) time in which the data of a symbol is received.

FIG. 9 illustrates that an RS 902 of length k1 is input to DFT block 904 for DFT spreading. The resultant spread symbol samples in the frequency domain from DFT block 904 are then input to a tone mapper 906 for subcarrier mapping to various subcarriers. After the tone mapping is performed in tone mapper 906, the k1 samples are inverse discrete Fourier transformed (e.g., Inverse Fast Fourier transformed (IFFT)) at IDFT transform block 908 back to the time domain to yield a symbol having a length of n*k1/k where k is the sum of the length of the RS having a length k1 and the data portion having a length k2, wherein the data portion is input in the subsequent time period reflected in FIG. 10. A CP is then cyclically copied from the tail portion of the RS portion of the symbol by CP adding block 910, and the copy is placed at the beginning of the symbol to achieve output symbol 912. As illustrated, symbol 912 contains an RS 914 and an RS CP 916 that has been copied from the tail portion of RS 914. In one example, the length of the CP 916 has a length "c" (e.g., a predetermined length), and the number of samples copied from the RS 914 is in the range from n*(k1/k)−c+1 to n*(k1/k).

Turning to FIG. 10, the illustrated transmitter 1000 at a second time (e.g., after the time illustrated in FIG. 9) receives the data 1002 of a symbol having a length of k2 where k=k1+k2, with k1 being the length of the RS. The data 1002 of length k2 is input to a DFT block 1004 having a size k2 for DFT spreading. The spread symbol samples in the frequency domain are then input to a tone mapper 1006 for subcarrier mapping to various subcarriers. After the tone mapping is performed by tone mapper 1006, the k2 samples are inverse discrete Fourier transformed (e.g., inverse fast Fourier transformed (IFFT)) at IDFT transform block 1008 back to the time domain to yield a symbol having a length of n*(k2/k), where k2 is the data length and k is the sum of the length of the RS having a length k1 and the data length k2 (i.e., k=k1+k2). Since the CP was added to the RS as shown in FIG. 9, no CP is added to the data and the data symbol 1010 simply has a length equal to n*(k2/k).

Figure 11:
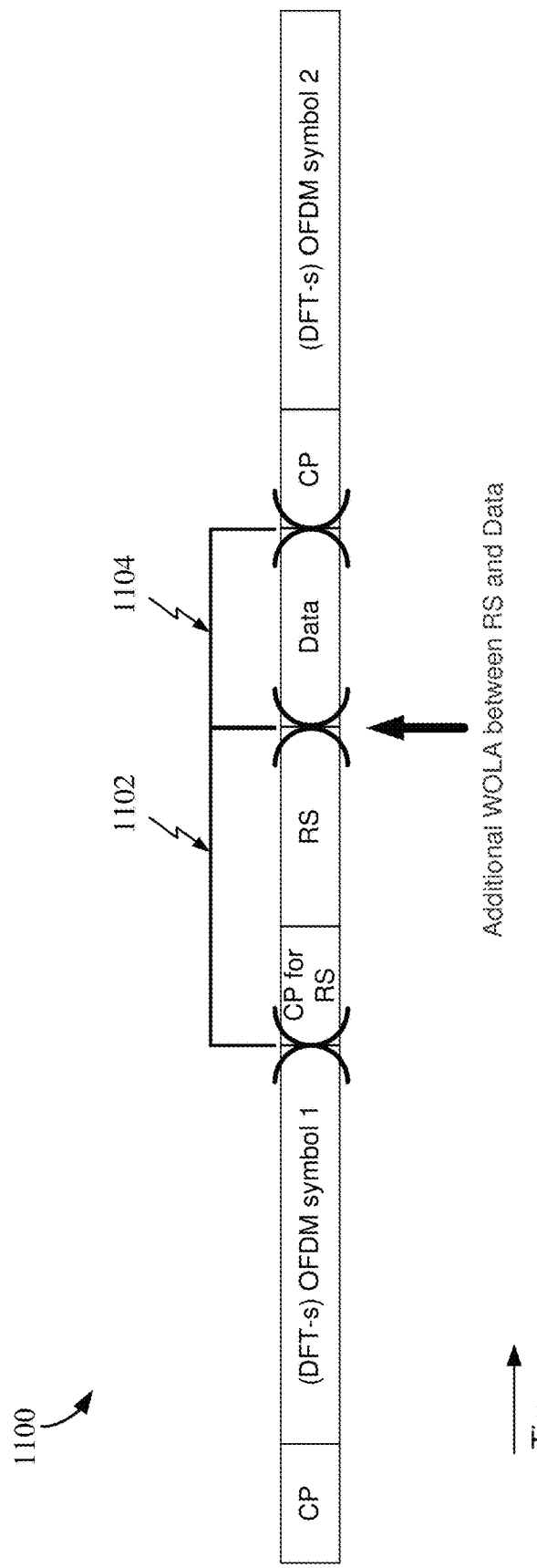
FIG. 11 illustrates an exemplary waveform utilizing the symbol disclosed in FIG. 7.

In an aspect of the present disclosure, it is noted that for the split waveform example of FIGS. 9 and 10, in particular, there may be a need to reduce inter-carrier interference (ICI) over the frequency. In such case, weighted overlapping and add (WOLA) may be added to the waveform between the RS+CP symbol (e.g., 912) and the data symbol (e.g., 1010) to further reduce the ICI for the waveform. FIG. 11 provides an illustration of a waveform 1100 that includes the symbol RS with the RS CP shown over period 1102 and the data symbol shown over period 1104. If WOLA is used, then the additional WOLA will be added between the RS symbol period 1102 and the data symbol period 1104.

Figure 12:
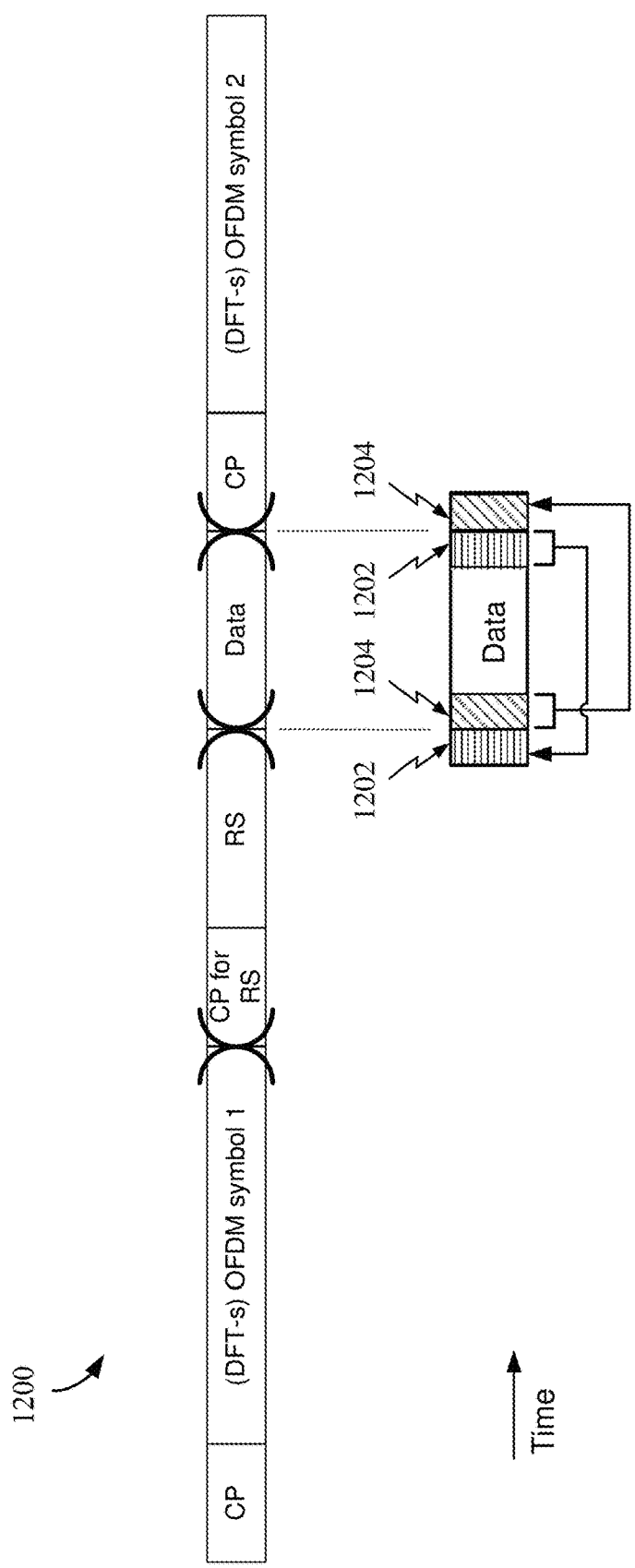
FIG. 12 illustrates addition of WOLA windowing to the waveform of FIG. 11.
Figure 13:
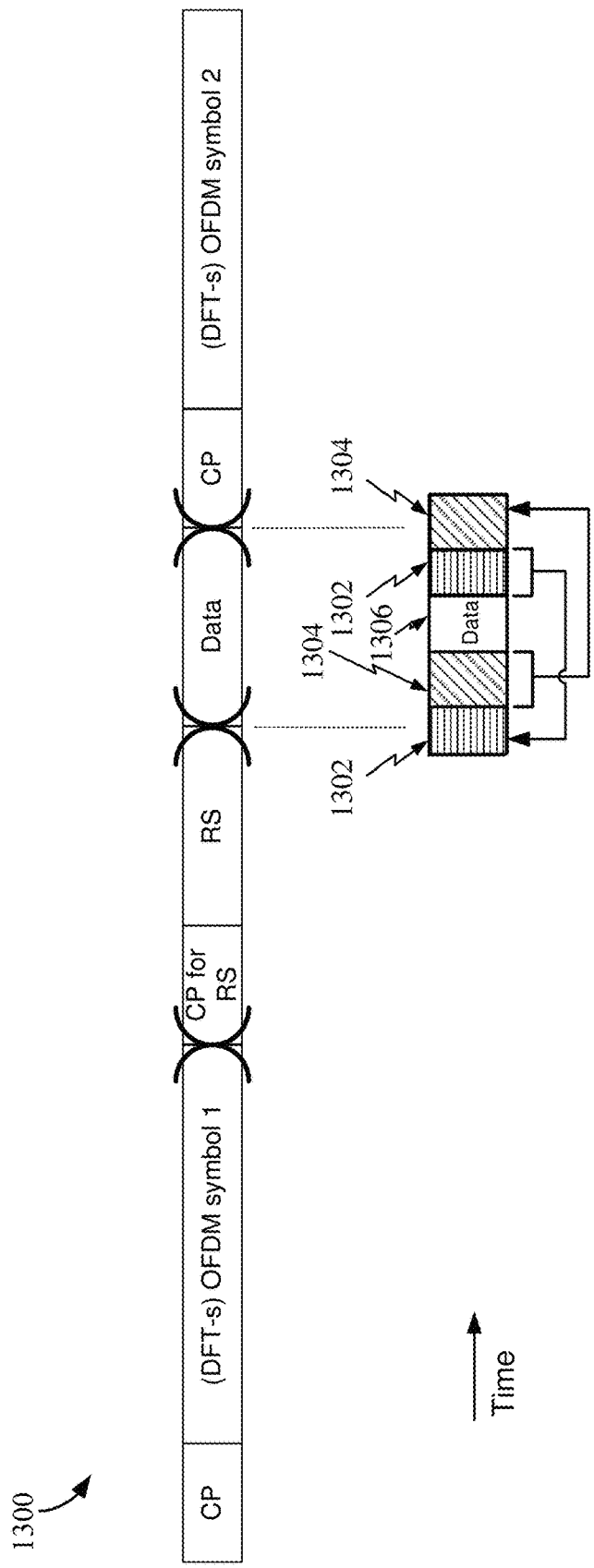
FIG. 13 illustrates a further example of adding modified WOLA windowing to the waveform of FIG. 12.

FIG. 12 illustrates an exemplary addition of WOLA windowing to the waveform of FIG. 11 according to an aspect of the present disclosure. As may be seen in FIG. 12, WOLA windowing is applied to the data symbol where the shaded portions 1202 and 1204 on the ends of the data window represent the WOLA. It is noted, however, that these portions 1202, 1204 overlapping the data may cause the data to become corrupted. Accordingly, FIG. 13 illustrates that the data may be cyclically extended to protect the part of the data overlapped by WOLA. Accordingly, FIG. 13 illustrates that a k2-WOLA length is available for data, and the WOLA length is to be filled with cyclic extension (e.g., 1302 and 1304 showing WOLA and cyclic extension). Accordingly, the data length of data 1306 is shrunk in order to avoid corruption of the data.

Figure 14:
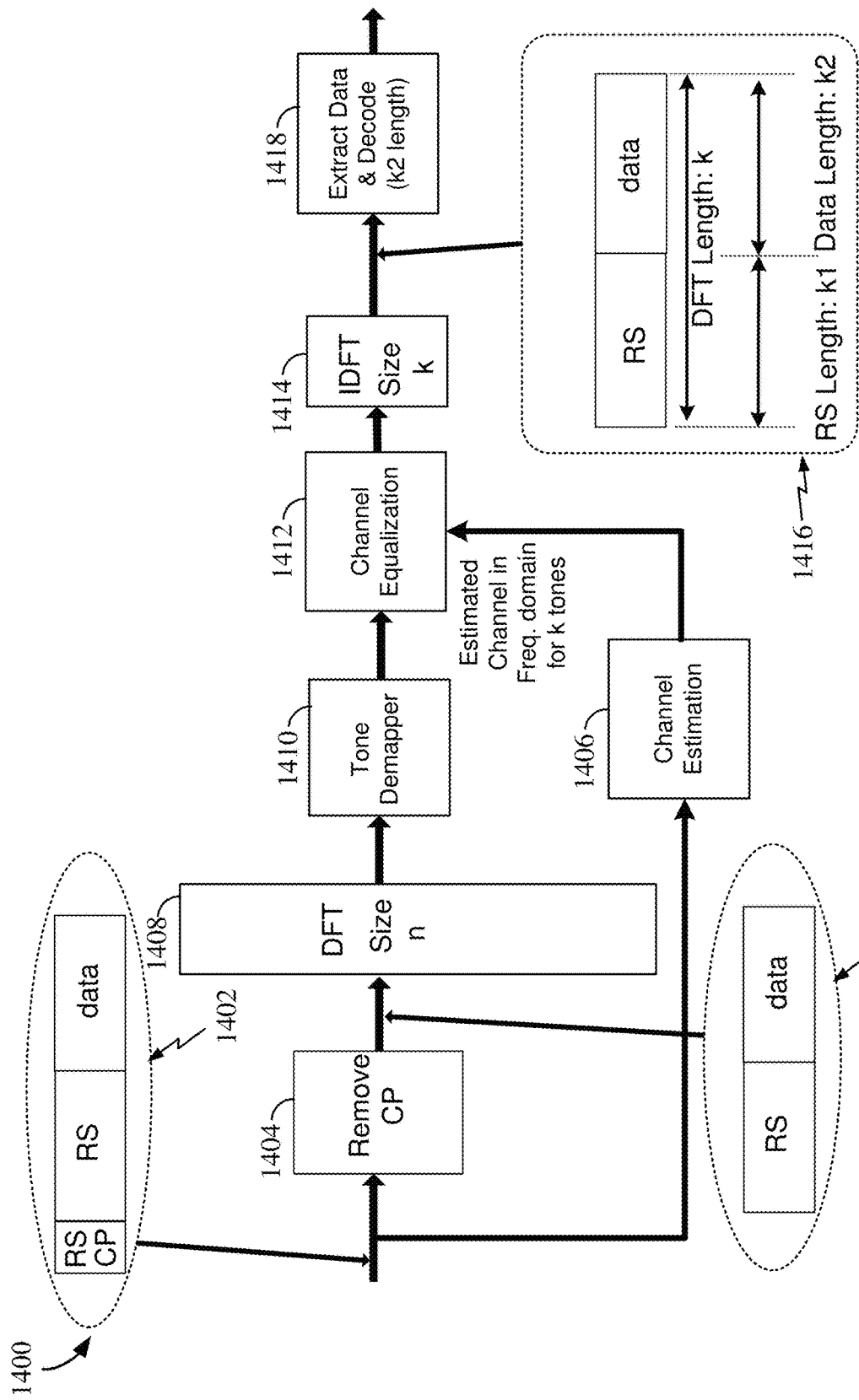
FIG. 14 illustrates an exemplary receiver for receiving RS and Data virtual time division multiplexing (TDM) symbols.

FIG. 14 illustrates an exemplary receiver diagram 1400 configured to receive the virtual TDM symbols transmitted by transmitters such as those illustrated in the examples of FIG. 8 or FIGS. 9 and 10. Receiver 1400 may be operable according to conventional DFT-s-OFDM types of receivers apart from the particular channel estimation used in receiver 1400. The receiver 1400 receives the waveform transmitted by a transmitter, such as the transmitters in FIGS. 8-10, including the illustrated symbol 1402 that includes the RS, data, and RS CP fields. The symbol is input to a CP removal block 1404, as well as to a channel estimation block 1406. Block 1404 removes the CP from the symbol 1402 as illustrated by symbol 1407 that is passed from the CP removal block to an DFT 1408 of size n (i.e., the size of the RS and data fields). After the DFT 1408 converts the time signal to the frequency domain, a tone demapper 1410 demaps the k number of tones or samples and inputs the samples to a channel equalization block 1412.

Channel equalization block 1412 receives a channel estimate from channel estimation block 1406, which is based on the RS in the symbol and will be explained in further detail later with respect to FIG. 15. After accounting for the channel estimate, the channel equalization, channel equalization block 1412 inputs samples to an Inverse Discrete Fourier transform (IDFT) 1414 for conversion to a k number of samples (i.e., the length k=k1+k2) of the original virtual TDM symbol that was input to the DFT spread at a transmitter. That is, the output of IDFT 1414 is the RS+data symbol having a length k equal to the DFT length as illustrated by the shown representation of the symbol 1416 output from IDFT 1414. The data portion of symbol 1416 is then extracted and decoded for further processing in the receiver as shown by block 1418.

Of note, the RS-CP is not the CP for DFT-s-OFDM symbol (e.g., 1402), but rather is only the CP for the RS portion. While it is conceivable that the first part of DFT-s-OFDM symbol (e.g., 1402) will suffer from ISI, this ISI is not significant since the first part of symbol is the RS not the data. Accordingly, the data portion of the symbol will be essentially free of any ISI.

Figure 15:
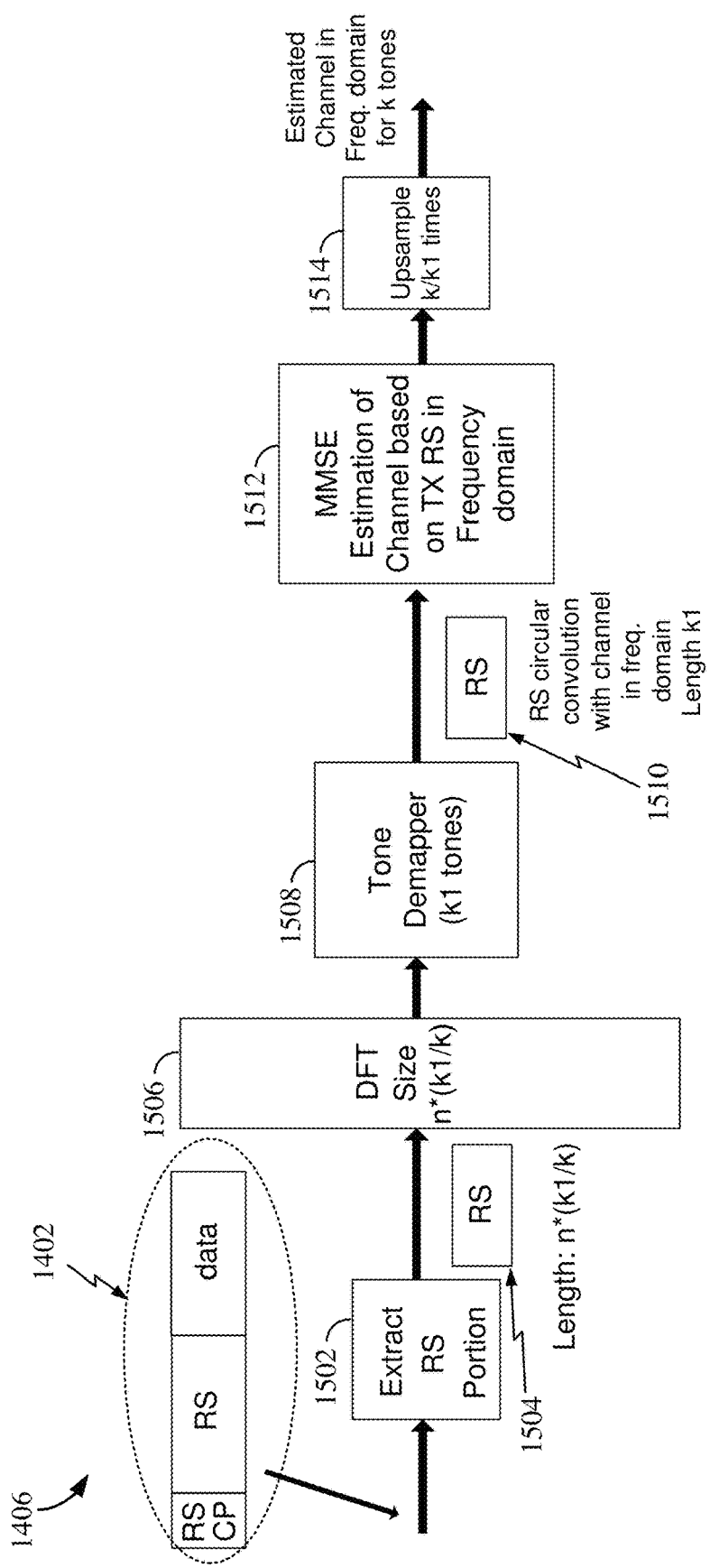
FIG. 15 illustrates an exemplary channel estimator used in the receiver of FIG. 14.

FIG. 15 further illustrates detailed aspects of the channel estimation block 1406 shown in FIG. 14. As shown, the channel estimator 1406 receives the received input symbol 1402 comprising the RS, data, and RS CP. Since the RS is used for channel estimation, an RS extractor 1520 is provided to extract out only the RS portion of the symbol 1402, the resultant RS being shown at 1514 having length n*(k1/k). The RS portion is input to a DFT 1506 having a size of n*(k1/k) equal to the RS length. After conversion to frequency domain, a tone demapper 1508 of k1 tones demaps the samples to derive an RS circular convolution with the channel in the frequency domain and a length of k1.

The channel estimator 1406 may further include a Minimum Mean Square error (MMSE) estimator 1512, but the disclosure is not limited to such and various other known methods for measuring estimates and determining estimate quality could be used as well. In the illustrated example, the MMSE estimator 1512 is used to estimate the channel based on the transmitted RS in the frequency domain. Since the channel estimate is to be input to the channel equalizer 1412 shown in FIG. 14, which is equalizing the channel for the RS+data (i.e., k tones or length), channel estimator 1406 may also include an upsampling block 1514 that upsamples the channel estimate by k/k1 times to obtain a full channel estimate for all k tones. By virtue of the operation of IDFTs and DFTs, the first estimate is downsampled in the frequency domain, and then upsampled in frequency domain by block 1514. Due to this down then up sampling, the value of k1, in one example, is selected to be an integer fraction of k. Of further note, the ISI for the RS is protected by the CP (i.e., the RS CP). Thus, the channel estimate performed by channel estimator 1406 may be free of ISI.

Figure 16:
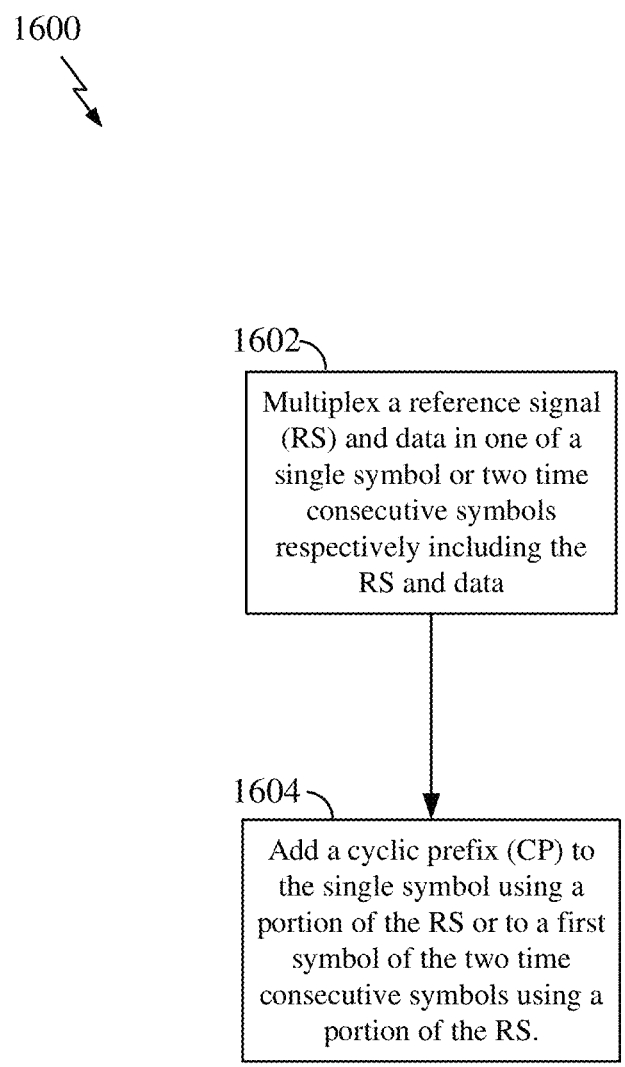
FIG. 16 is a flow chart illustrating exemplary processes for forming and/or transmitting a virtual TDM symbol with a CP based on the RS but not the data in a symbol in accordance with some aspects of the present disclosure.

FIG. 16 is a flow chart illustrating an exemplary process 1600 for forming and/or transmitting a virtual TDM symbol with a CP based on the RS but not the data in a symbol in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity 400 illustrated in FIG. 4 or the scheduled entity 500 in FIG. 5. In some examples, the process 1600 may be carried out by any suitable apparatus or means for carrying out the functions or algorithm described below.

At block 1602, process 1600 includes multiplexing a reference signal (RS) and data in one of a single symbol or two time consecutive symbols respectively including the RS and data. This process in block 1602 may encompass the transmitter functions described above with respect to FIG. 8 or FIGS. 9 and 10. After block 1602, flow proceeds to block 1604 where a cyclic prefix (CP) is added to the single symbol using a portion of the RS or to a first symbol of the two time consecutive symbols using a portion of the RS. As will be appreciated, the process 1604 may include the addition of the CP as performed by block 812 in FIG. 8 or by block 910 in FIG. 9.

Of further note, method 1600 may also include spreading the single symbol or at least the first of the two time consecutive symbols with at least a discrete Fourier transform (DFT) prior to adding the CP to the single symbol or the first symbol of the two time consecutive symbols using the portion of the RS. Moreover, a length of the RS may be configured as an integer fraction or multiple of a length of the DFT or an integer fraction or multiple of a total length of the sum of the lengths of the RS symbol and the data symbol when using two time consecutive symbols. Method 1600 may also include the CP being cyclically copied from a predetermined end portion of the RS, as was discussed earlier herein.

According to still further aspect, method 1600 may also include the predetermined end portion of the RS being within a range of a number of samples in the RS between a sample number value n*(k1/k)−c+1 and a sample number value n*(k1/k), where n is a number of samples of an Inverse Discrete Fourier Transform (IDFT) performed after the Discrete Fourier transform (DFT), k is the total length of the sum of the lengths of the RS symbol and the data symbol, k1 is the length of the RS symbol, and c is a predetermined number of samples for the CP length. Moreover, when using two time consecutive symbols respectively including the RS and data (e.g., the examples of FIGS. 9 and 10), method 1600 may further include adding Weighted Overlapping and Add (WOLA) between the two time consecutive symbols. This process may also include cyclically extending the data symbol to protect portion of the data symbol covered by the added WOLA according to an aspect.

Figure 17:
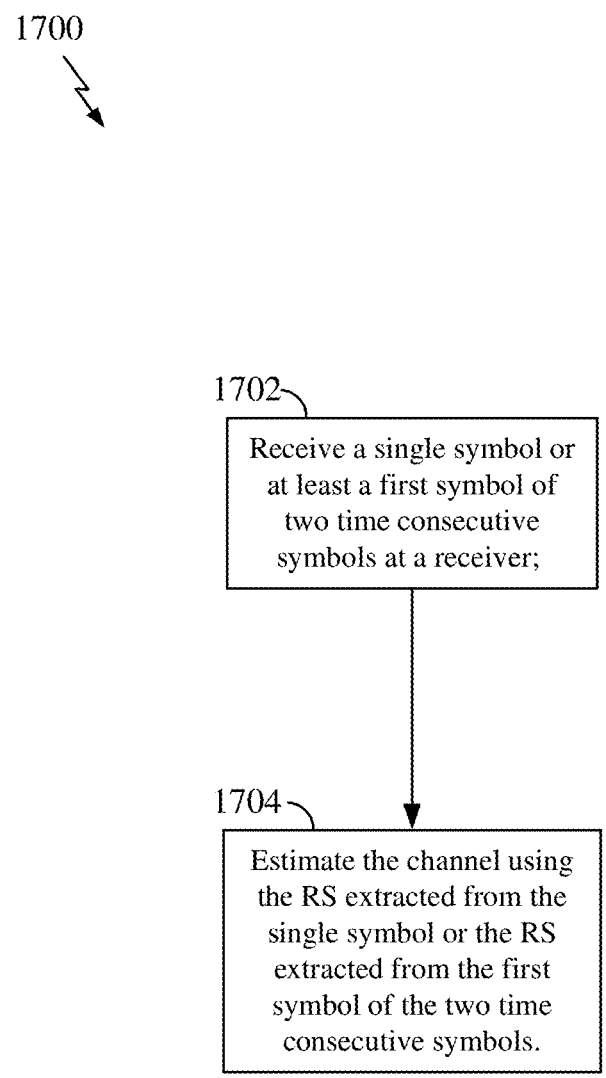
FIG. 17 is a flow chart illustrating exemplary processes for receiving and demodulating/decoding a virtual TDM symbol with a CP based on the RS but not the data in a symbol in accordance with some aspects of the present disclosure.

FIG. 17 is a flow chart illustrating another exemplary process 1700 for receiving and decoding a virtual TDM symbol with a CP based on the RS but not the data in a symbol in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 400 illustrated in FIG. 4 or the scheduled entity 500 in FIG. 5. In some examples, the process 1700 may be carried out by any suitable apparatus or means for carrying out the functions or algorithm described below.

At block 1702, process 1700 includes receiving a single symbol or at least a first symbol of two time consecutive symbols at a receiver. The process in block 1702 may encompass the receiver functions described above with respect to FIGS. 14 and 15. After block 1702, flow proceeds to block 1704 where the channel is estimated using the RS extracted from the single symbol or the RS extracted from the first symbol of the two time consecutive symbols. As will be appreciated, the process 1704 may include the channel estimation as performed by block 1406 in the apparatus of FIGS. 14 and 15.

In one configuration, it is noted that the apparatus 400 or 500 as shown in FIGS. 4 and 5, respectively, may include various means for wireless communication. In one aspect, the aforementioned means may be the processor(s) 404 or 504 configured to perform the functions discussed herein. In another aspect, the aforementioned means may be a circuit or any apparatus configured to perform the functions recited by the aforementioned means.

Of course, in the above examples, the circuitry included in the processors 404 or 504 is merely provided as an example, and other means for carrying out the described functions may be included within various aspects of the present disclosure, including but not limited to the instructions stored in the computer-readable storage media 406 and 506 or any other suitable apparatus or means described in any one of the FIGS. 1, 8-10, 14, and 15, and utilizing, for example, the processes and/or algorithms described herein in relation to FIGS. 16 and/or 17.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 8-10, 14, and 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   multiplexing a reference signal (RS) and data in one of a single symbol or two time consecutive symbols respectively including the RS in a first symbol of the two time consecutive symbols and data in a second symbol of the two time consecutive symbols; and
   adding a cyclic prefix (CP) to the single symbol using a portion of the RS if the RS and data are multiplexed in a single symbol, or adding a CP to the first symbol of the two time consecutive symbols using a portion of the RS without adding a CP to the second symbol if the RS and data are multiplexed in two time consecutive symbols.

2. The method of claim 1, further comprising:
   spreading the single symbol or at least the first of the two time consecutive symbols with at least a discrete Fourier transform (DFT) prior to adding the CP to the single symbol or the first symbol of the two time consecutive symbols using the portion of the RS.

3. The method of claim 2, wherein a length of the RS is an integer fraction or multiple of a length of the DFT or an integer fraction or multiple of a total length of the sum of the lengths of the RS symbol and the data symbol when using two time consecutive symbols.

4. The method of claim 2, further comprising cyclically copying the CP from a predetermined end portion of the RS.

5. The method of claim 4, wherein the predetermined end portion of the RS is within a range of a number of samples in the RS between a sample number value $n*(k1/k)-c+1$ and a sample number value $n*(k1/k)$, where n is a number of samples of an Inverse Discrete Fourier Transform (IDFT) performed after the Discrete Fourier transform (DFT), k is the total length of the sum of the lengths of the RS symbol and the data symbol, k1 is the length of the RS symbol, and c is a predetermined number of samples for the CP length.

6. The method of claim 1, further comprising:
   when using the two time consecutive symbols respectively including the RS and data, adding Weighted Overlapping and Add (WOLA) between the two time consecutive symbols.

7. The method of claim 6, further comprising:
   cyclically extending the data symbol to protect portion of the data symbol covered by the added WOLA.

8. The method of claim 1, further comprising:
   receiving the single symbol or at least the first symbol of the two time consecutive symbols at a receiver; and
   estimating the channel using the RS extracted from the single symbol or the RS extracted from the first symbol of the two time consecutive symbols.

9. An apparatus for wireless communication, comprising:
   means for multiplexing a reference signal (RS) and data in one of a single symbol or two time consecutive symbols respectively including the RS in a first symbol of the two time consecutive symbols and data in a second symbol of the two time consecutive symbols; and
   means for adding a cyclic prefix (CP) to the single symbol using a portion of the RS if the RS and data are multiplexed in a single symbol, or adding a CP to the first symbol of the two time consecutive symbols using a portion of the RS without adding a CP to the second symbol if the RS and data are multiplexed in two time consecutive symbols.

10. The apparatus of claim 9, further comprising:
means for spreading the single symbol or at least the first of the two time consecutive symbols with at least a discrete Fourier transform (DFT) prior to adding the CP to the single symbol or the first symbol of the two time consecutive symbols using the portion of the RS.

11. The apparatus of claim 10, wherein a length of the RS is an integer fraction or multiple of a length of the DFT or an integer fraction or multiple of a total length of the sum of the lengths of the RS symbol and the data symbol when using two time consecutive symbols.

12. The apparatus of claim 9, wherein the CP is cyclically copied from a predetermined end portion of the RS.

13. The apparatus of claim 12, wherein the predetermined end portion of the RS is within a range of a number of samples in the RS between a sample number value $n*(k1/k)-c+1$ and a sample number value $n*(k1/k)$, where n is a number of samples of an Inverse Discrete Fourier Transform (IDFT) performed after the Discrete Fourier transform (DFT), k is the total length of the sum of the lengths of the RS symbol and the data symbol, k1 is the length of the RS symbol, and c is a predetermined number of samples for the CP length.

14. The apparatus of claim 9, further comprising:
means for adding Weighted Overlapping and Add (WOLA) between the two time consecutive symbols when using the two time consecutive symbols respectively including the RS and data.

15. The apparatus of claim 14, further comprising:
means for cyclically extending the data symbol to protect portion of the data symbol covered by WOLA.

16. The apparatus of claim 9, further comprising:
means for receiving the single symbol or at least the first symbol of the two time consecutive symbols at a receiver; and
means for estimating the channel using the RS extracted from the single symbol or the RS extracted from the first symbol of the two time consecutive symbols.

17. A non-transitory computer-readable medium storing computer-executable code, comprising code for causing a processor to:
multiplex a reference signal (RS) and data in one of a single symbol or two time consecutive symbols respectively including the RS in a first symbol of the two time consecutive symbols and data in a second symbol of the two time consecutive symbols; and
add a cyclic prefix (CP) to the single symbol using a portion of the RS if the RS and data are multiplexed in a single symbol, or adding a CP to the first symbol of the two time consecutive symbols using a portion of the RS without adding a CP to the second symbol if the RS and data are multiplexed in two time consecutive symbols.

18. The non-transitory computer-readable medium of claim 17, further comprising code for causing a processor to:
spread the single symbol or at least the first of the two time consecutive symbols with at least a discrete Fourier transform (DFT) prior to adding the CP to the single symbol or the first symbol of the two time consecutive symbols using the portion of the RS.

19. The non-transitory computer-readable medium of claim 18, wherein a length of the RS is an integer fraction or multiple of a length of the DFT or an integer fraction or multiple of a total length of the sum of the lengths of the RS symbol and the data symbol when using two time consecutive symbols.

20. The non-transitory computer-readable medium of claim 17, wherein the CP is cyclically copied from a predetermined end portion of the RS.

21. The non-transitory computer-readable medium of claim 20, wherein the predetermined end portion of the RS is within a range of a number of samples in the RS between a sample number value $n*(k1/k)-c+1$ and a sample number value $n*(k1/k)$, where n is a number of samples of an Inverse Discrete Fourier Transform (IDFT) performed after the Discrete Fourier transform (DFT), k is the total length of the sum of the lengths of the RS symbol and the data symbol, k1 is the length of the RS symbol, and c is a predetermined number of samples for the CP length.

22. The non-transitory computer-readable medium of claim 17, further comprising code for causing a processor to:
add Weighted Overlapping and Add (WOLA) between the two time consecutive symbols when using the two time consecutive symbols respectively including the RS and data.

23. The non-transitory computer-readable medium of claim 22, further comprising code for causing a processor to:
cyclically extend the data symbol to protect portion of the data symbol covered by WOLA.

24. An apparatus for wireless communication, comprising:
a processor;
a transceiver communicatively coupled to the at least one processor; and
a memory communicatively coupled to the at least one processor,
wherein the processor is configured to:
multiplex a reference signal (RS) and data in one of a single symbol or two time consecutive symbols respectively including the RS in a first symbol of the two time consecutive symbols and data in a second symbol of the two time consecutive symbols; and
add a cyclic prefix (CP) to the single symbol using a portion of the RS if the RS and data are multiplexed in a single symbol, or adding a CP to the first symbol of the two time consecutive symbols using a portion of the RS without adding a CP to the second symbol if the RS and data are multiplexed in two time consecutive symbols.

25. The apparatus of claim 24, wherein the processor is configured to:
spread the single symbol or at least the first of the two time consecutive symbols with at least a discrete Fourier transform (DFT) prior to adding the CP to the single symbol or the first symbol of the two time consecutive symbols using the portion of the RS.

26. The apparatus of claim 25, wherein a length of the RS is an integer fraction or multiple of a length of the DFT or an integer fraction or multiple of a total length of the sum of the lengths of the RS symbol and the data symbol when using two time consecutive symbols.

27. The apparatus of claim 24, wherein the processor is configured to:
cyclically copy the CP from a predetermined end portion of the RS.

28. The apparatus of claim 27, wherein the predetermined end portion of the RS is within a range of a number of samples in the RS between a sample number value $n*(k1/k)-c+1$ and a sample number value $n*(k1/k)$, where n is a number of samples of an Inverse Discrete Fourier Transform (IDFT) performed after the Discrete Fourier transform (DFT), k is the total length of the sum of the lengths of the RS symbol and the data symbol, k1 is the length of the RS symbol, and c is a predetermined number of samples for the CP length.

29. The apparatus of claim 24, wherein the processor is configured to:
   add Weighted Overlapping and Add (WOLA) between two time consecutive symbols when using the two time consecutive symbols that respectively include the RS and data.

30. The apparatus of claim 29, wherein the processor is configured to:
   cyclically extend the data symbol to protect portion of the data symbol covered by WOLA.

* * * * *